April 15, 1924.
A. J. DE LATEUR
1,490,594
VENEER AND ROTARY CUT LUMBER STACKER
Filed March 26, 1923     5 Sheets-Sheet 1
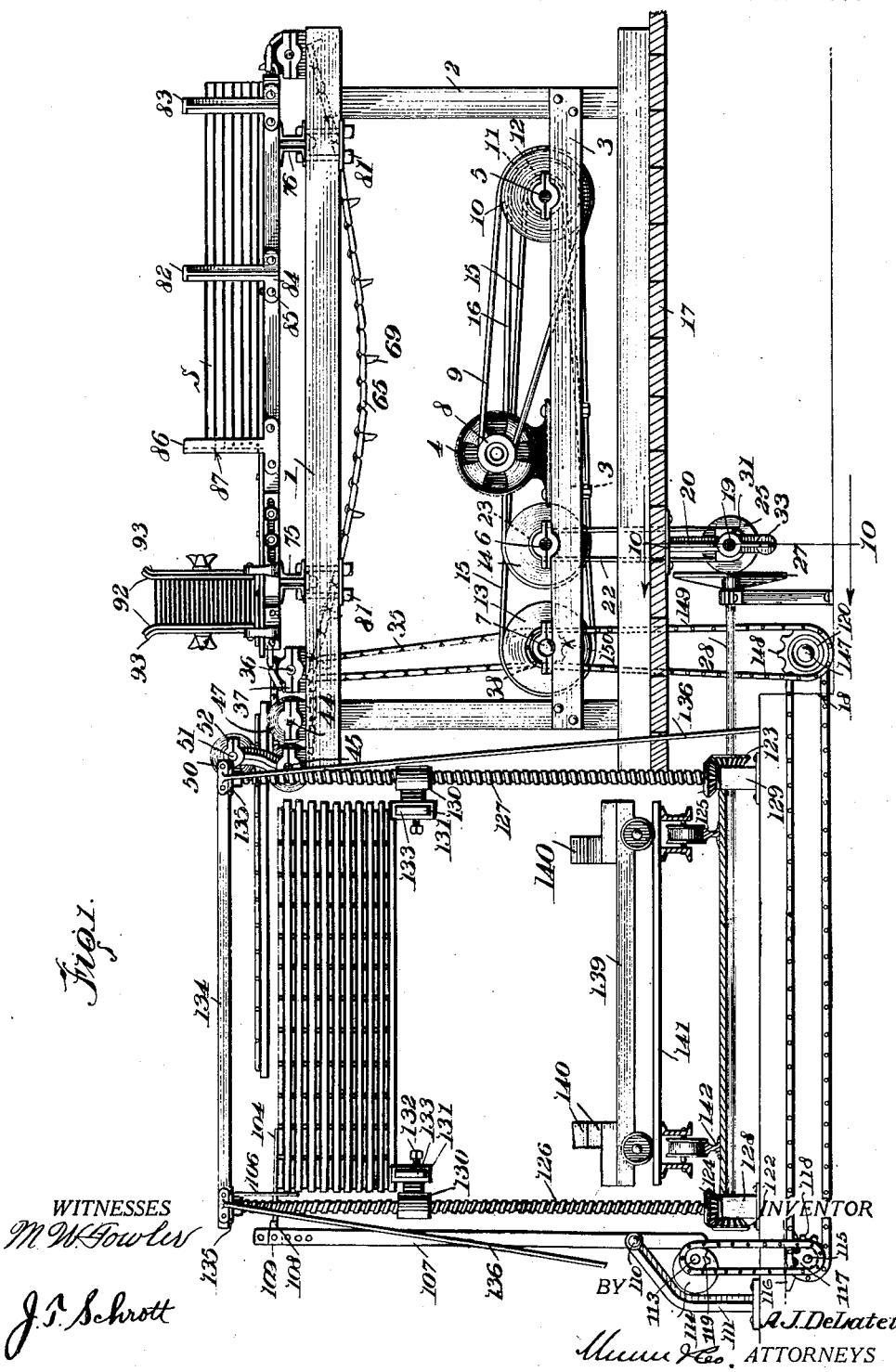

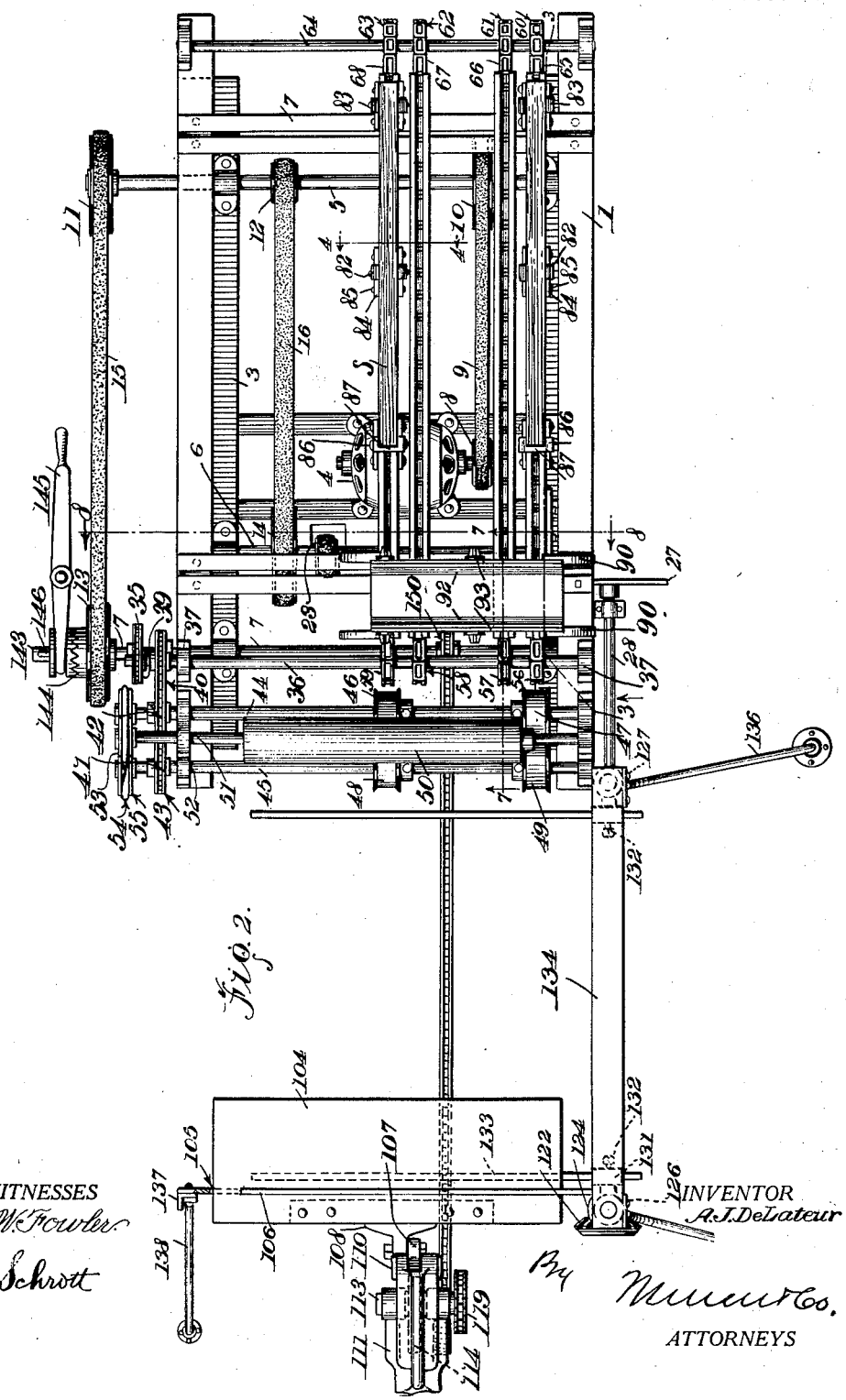

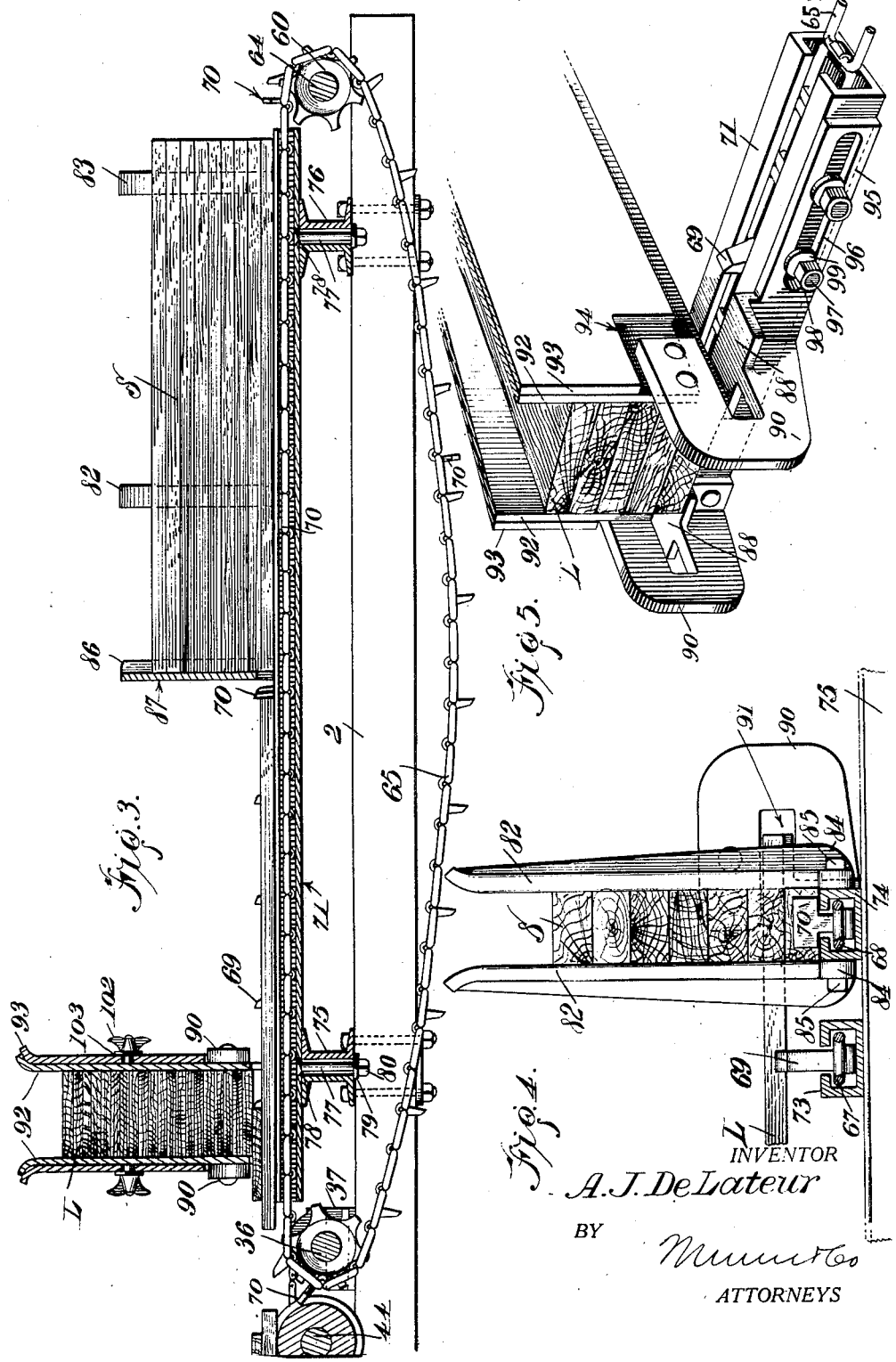

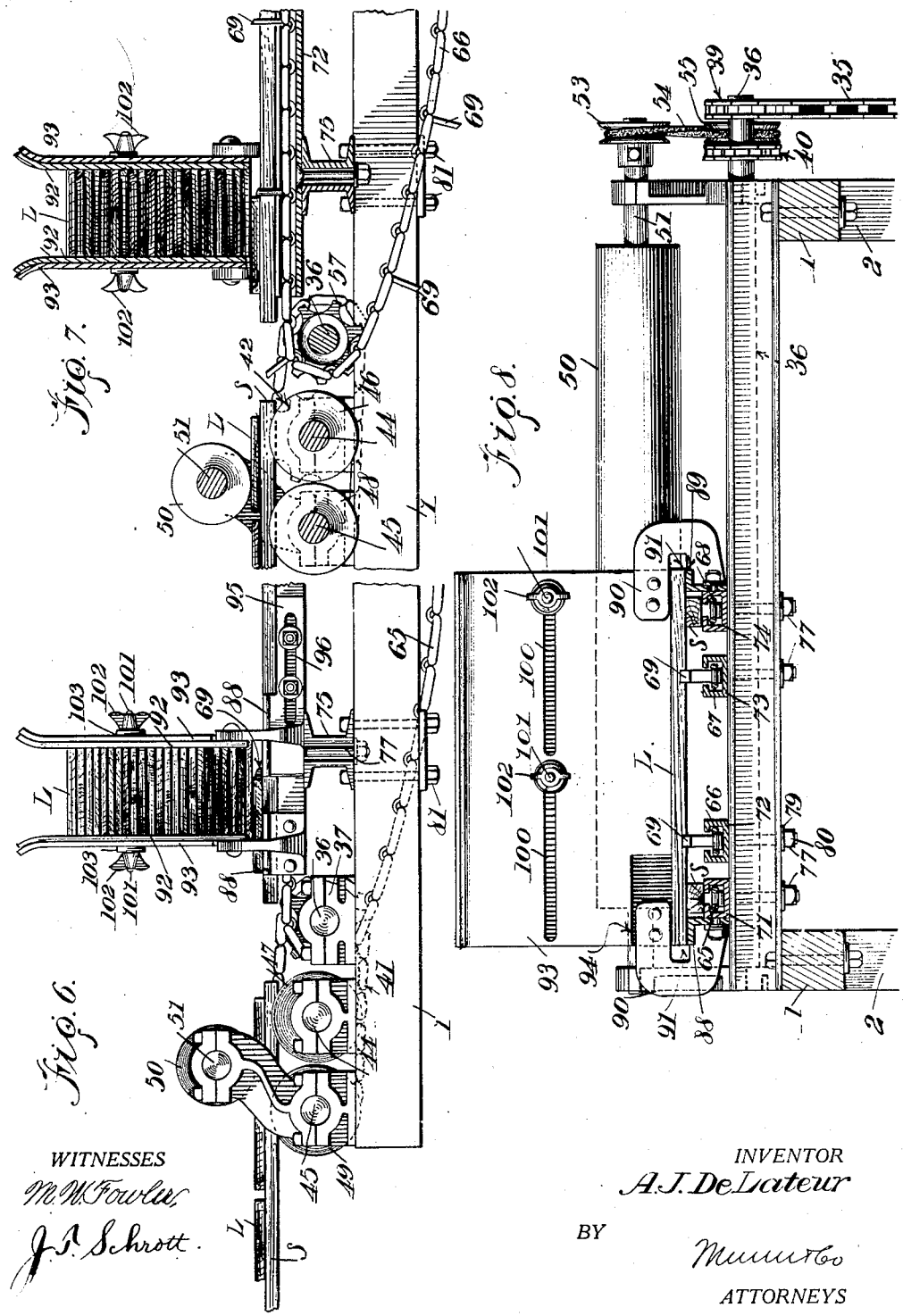

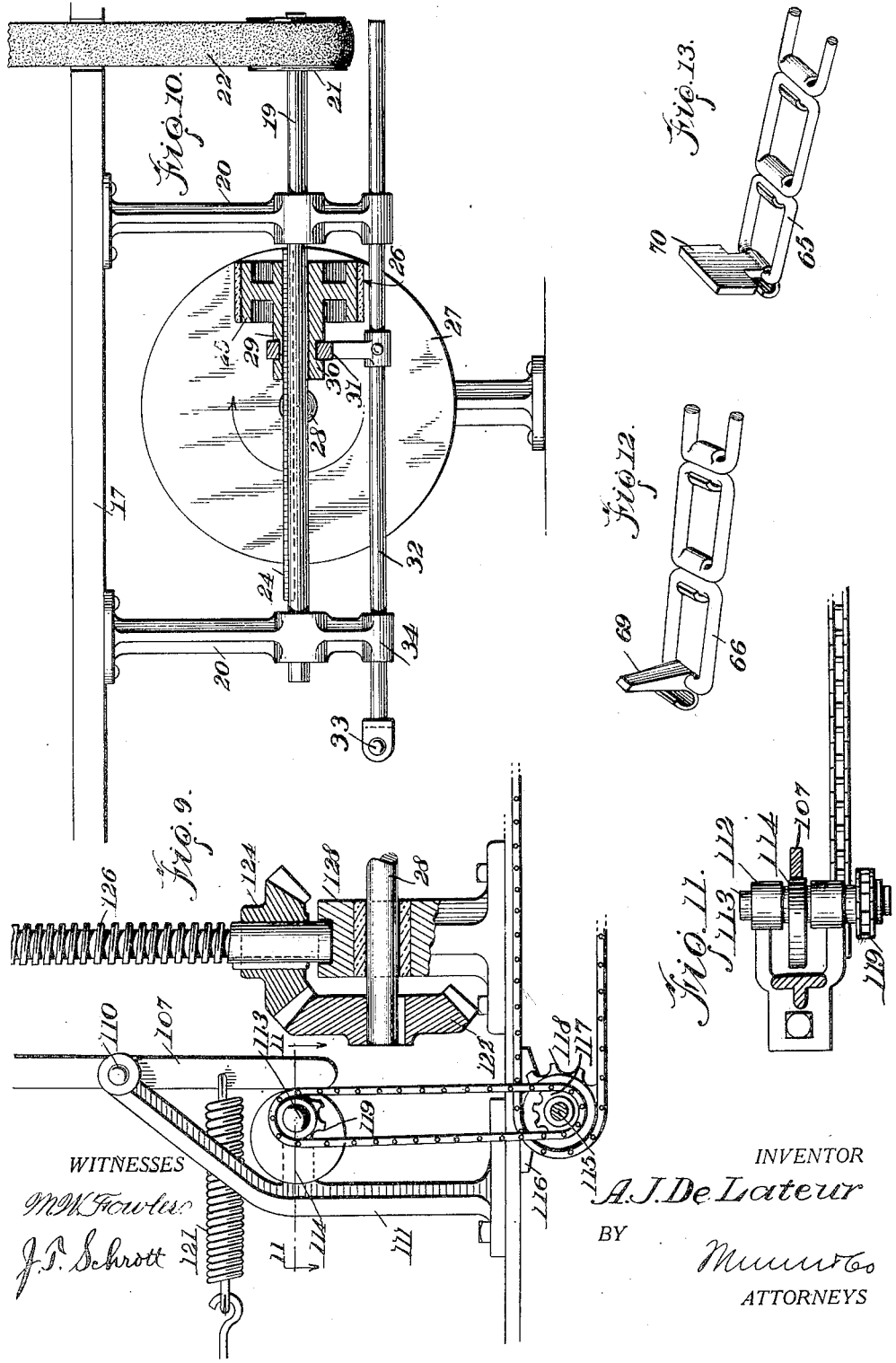

Patented Apr. 15, 1924.

1,490,594

UNITED STATES PATENT OFFICE.

ALPHONSE JOSEPH DE LATEUR, OF RAYMOND, WASHINGTON.

VENEER AND ROTARY CUT LUMBER STACKER.

Application filed March 26, 1923. Serial No. 627,826.

*To all whom it may concern:*

Be it known that I, ALPHONSE JOSEPH DE LATEUR, a citizen of the United States, and a resident of Raymond, in the county of Pacific and State of Washington, have invented certain new and useful Improvements in Veneer and Rotary Cut Lumber Stackers, of which the following is a specification.

My invention relates to improvements in veneer and rotary cut lumber stackers, and it consists of the constructions, combinations and mode of operation herein described and claimed.

An object of the invention is to provide a machine for stacking lumber, the device herein disclosed being adapted more particularly for stacking veneer, box shooks and other rotary cut lumber of a similar nature in so far as size and weight are concerned on a truck preparatory to drying either in a kiln or in the open air.

A further object of the invention resides in the unique manner of feeding the sticks under the stock to be dried, at the same time spreading the stock over the entire length of the sticks, one piece at a time.

A further object of the invention is to provide chains for feeding the sticks but at the same time providing means to keep the sticks free of the chains, thus not only avoiding undue and undesirable pressure upon the chains themselves, but also preventing the feeding of sticks before the proper time.

A further object of the invention is to provide means for guiding the sticks so that an absolutely straight course is insured.

A further object of the invention is to cause the sticks carrying the spread stock to project from the spreading table in a perfectly horizontal plane and preventing the front end of the sticks from dipping toward the stock elevator before said projected sticks assume the desired position in respect thereto.

A further object of the invention is to provide means for receiving the front and otherwise unsupported ends of the sticks when projected over the stock elevator to aid in conveying them during the last few inches into the desired position.

A further object of the invention is to provide a bumper at one side of the elevator which functions to keep all of the sticks straight when stacked on the elevator.

Other objects and advantages will appear in the following specification, reference being had to the accompanying drawings, in which:

Fig. 1 is a side elevation of the improved lumber stacker,

Fig. 2 is a plan view of the structure shown in Fig. 1,

Fig. 3 is a longitudinal section taken on the line 3—3 of Fig. 2,

Fig. 4 is a detail cross section taken on the line 4—4 of Fig. 2,

Fig. 5 is a detail perspective view of one end of the stock hopper of the feeding table, Fig. 6 is a detail side elevation of the discharge end of the feeding table, Fig. 7 is a detail sectional view on the line 7—7 of Fig. 2, Fig. 8 is a cross section taken on the line 8—8 of Fig. 2, Fig. 9 is a detail view, parts being in section, of the driving means at the lower left side of the stacking elevator in Fig. 1, Fig. 10 is a section taken on the line 10—10 of Fig. 1, and showing the shifting means for the drive wheel, Fig. 11 is a detail sectional view on the line 11—11 of Fig. 9, showing the eccentric which periodically rocks the supporting plate arm, Fig. 12 is a detail perspective view of one of the lugs for forwarding the stock, also showing a portion of the chain by which it is carried, and Fig. 13 is a detail perspective view of a portion of another chain showing one of the lugs for forwarding the sticks.

The description is divided into the following subjects: (1) The feeding table, (2) The stick hopper, (3) The stock hopper, (4) The stacking elevator, and (5) The operation. This plan of description is adopted so as to make reference to the construction of any particular part of the mechanism easy. The description of many of the detailed parts is accompanied by a brief description of the operation, but a résumé of the entire operation is found under the last subject.

*(1) The feeding table* comprises a frame which has upper horizontal beams 1, vertical supports 2 and lowermost horizontal beams 3 which are suitably disposed to support the driving motor 4, and the countershafts 5, 6 and 7.

The motor 4 carries a pulley 8 which drives the belt 9 which in turn is applied to a pulley 10 on the countershaft 5 and so drives this countershaft.

Pulleys 11 and 12 on the countershaft 5 drive the pulleys 13 and 14 on the shafts 7 and 6 respectively, through belts 15 and 16. The direction of turning of the shafts and pulleys described is counter-clockwise. The table frame is mounted on a floor 17 which is suitably mounted over a pit 18 in which the driving mechanism for the stacking elevator is situated.

This drive mechanism consists of a shaft 19 (Fig. 10) which is supported beneath the floor 17 by hangers 20. The shaft carries a pulley 21 which is driven by a belt 22 from a pulley 23 on the countershaft 6 (Fig. 1). The shaft 19 (Fig. 10) has a key 24 upon which the drive wheel 25 is slidable.

The drive wheel 25 has a paper covering 26 which bears against the driven disk 27 of the stacking elevator shaft 28. The hub 29 of the drive wheel 25 has a groove 30 which is occupied by the fork 31 of the shifting rod 32. This rod may have connection at 33 with any suitable form of shifting device by means of which the rod may be slid back and forth in the bearing 34. Bearing in mind that the wheel 25 is continuously driven and is supposed to be in constant engagement with the disk 27, the reader can readily see that by sliding the drive wheel back and forth over the surface of the disk the speed of the shaft 28 will be varied according to the particular position that the drive wheel assumes in respect to the center of the disk. By moving the drive wheel past the center onto the left side of the disk 27 (Fig. 10) the direction of rotation of the shaft 28 will be reversed. In loading the stacking elevator, the drive wheel 25 is intended to remain on the right side of the center of the disk 27 (Fig. 10) and thus drive the shaft 28 in a clockwise direction. This causes the lowering of the stacking elevator which continues to lower until the proper load has been received. Having discharged its load onto the waiting truck, the elevator is again raised. This is accomplished by moving the drive wheel 25 past the center (Fig. 10) so that the disk 27 is made to turn in the counter-clockwise direction.

A chain 35 (Fig. 1) drives a front shaft 36 which is mounted in bearings 37 on top of the frame 1. The chain is applied to sprockets 38 and 39 on the shafts 7 and 36 respectively. The shaft 36 also has a sprocket 40 (Figs. 2 and 7) which drives a chain 41. This chain is applied to sprockets 42 and 43 on feed roller shafts 44 and 45 respectively. The manner of application of the chains 41 causes the pairs of feed rollers 46, 47 and 48, 49 to rotate in the counter-clockwise direction with the shaft 36 so as to feed the sticks from the feeding table toward the left (Fig. 1) into position on the stacking elevator.

A pressure roller 50 bears down on the stock distributed over the sticks (Figs. 1, 6 and 7). This roller is situated back of the center of the front pair of feed rollers 48, 49 so as to obtain a leverage upon the outgoing stock. This disposition of the pressure roller keeps the stock in a substantially horizontal position during the major portion of its outward movement. The pressure roller shaft 51 is supported in bearings 52. One end of the shaft carries a pulley 53 to which the crossed belt 54 is applied. This belt is driven by a corresponding pulley 55 on the adjacent front roller shaft 45. It is necessary to cross the belt 54 in order to obtain a clockwise rotation of the pressure roller 50, which roller thereby aids in feeding the stock forwardly.

The front shaft 36 carries sprockets 56, 57, 58 and 59 which are arranged in pairs as shown in Fig. 2. These sprockets have corresponding sprockets 60, 61, 62 and 63 on the rear shaft 64. These various sprockets are connected by chains 65, 66, 67 and 68.

The two inside chains 66 and 67 are for the purpose of feeding the stock and for this purpose are provided with lugs 69 at short intervals (Figs. 1 and 7). The outside chains 65 and 68 (Fig. 2) are provided with lugs 70 at longer intervals (Fig. 3) for the purpose of feeding the sticks. The respective chains run in channel guides 71, 72, 73 and 74 in the order described and shown in Fig. 2. The channel guides are supported by pairs of channel beams 75 and 76 (Fig. 1) which are placed in opposition to each other as shown, so as to provide central channels for the bolts 77.

These bolts are suitably fixed in the various guides 71, etc., as indicated at 78 in Fig. 3, so as to be dependent therefrom. The lower threaded end which extends below the channel beams or irons carry washers 79 and nuts 80 by means of which adjustments may be fixed. The channel guides 71 etc. are adjustable laterally of the spreading table. By unloosening the nuts the channel guides may be slid over upon the beams 75 and 76 to such positions as may be required to suit various lengths of stock to be handled. The beams 75 and 76 themselves are fastened at 81 (Fig. 1) to the uppermost wooden beams 1 of the table. This leads to a consideration of

(2) The stick hopper.

The hoppers 82 and 83 (Fig. 1) consist of pairs of uprights which have lateral ears 84 at the bottom by means of which they are fastened to the sides of the guides 71 and 74 as at 85. The hoppers 82 and 83 are substantially alike in every respect but the hoppers 86 at the front are different in that they include a connecting wall 87 which forms an abutment for the front end of the sticks S.

The reader will observe that the various uprights which constitute the hoppers above the guides 71 and 74 are nothing more than a bracket which insure the placing of the sticks S in the proper position and serves to hold them in such positions during the operation of the machine. The lowermost one of the sticks, and in fact the entire stack of sticks, rests upon the chain guide immediately below. In all cases the chain guides are slotted on top. This is for the obvious purpose of providing passage for the various lugs 69 and 70. Due to the fact that the weight of the sticks is imposed on the guides and not upon the chains, there is nothing to impede the free motion of the chains, and furthermore, there is no possibility of feeding more than one stick at a time. This would be the case even if the fronts 87 of the hoppers 86 were omitted. As it is, this front wall extends down so far as to permit only one stick to be discharged at a time.

(3) The stock hopper differs in several respects from the stick hoppers. One of the differences is that the stock hopper is adustable both for breadth and length of stock. The stick hoppers are not adjustable but are fixed to the guides by which they are carried. Another difference is that the stock L is supported by parts of the hopper itself above the guides. In the case of the stick hoppers the sticks are supported directly by the guides themselves.

It is necessary to support the stock L above the guides 71 etc. (Fig. 8) a distance at least the thickness of the sticks S, because were the stock permitted to rest directly upon the top of the guide the oncoming stick (pushed by the lugs 70, Fig. 3) would merely abut the nearest edge of the lowermost board, shook or veneer and therefore entirely defeat the purpose of the machine. It is intended that the stock shall be laid on top of the sticks one by one. This support of the stock L is accomplished by pairs of brackets 88 (Figs. 5 and 6) and 89. These are in the nature of alining shells on which the stock is adapted to rest.

Each bracket includes a U-shaped arm 90 which is bent into this particular shape for the double purpose of providing a passage 91 (Figs. 4 and 8) and a means of support of the inner and outer hopper sides 92 and 93. The passages 91 are ample enough to permit unobstructed outward movement of the lowermost piece of stock. The arms 90 on the left and right sides of the machine (Fig. 8) are respectively attached to the inner and outer plates of the hopper sides. The outer plates 93 are cut away at 94 so as to make room for the attaching ends of the adjacent arms 90.

For the purpose of adjusting the stock hopper for a difference in breadth of stock, the brackets 80 at the right have continuations 95 with slots 96 through which bolts 97 project. These bolts carry nuts 98 and washers 99 by means of which adjustments of the right wall of the hopper are fixed. The left wall is adapted to remain stationary by virtue of the associated brackets 88 being fixed. Adjustments of the stock hopper for variations in the length of stock are effected by thumb screw and slot arrangements. The outer plates 93 have slots 100 (Fig. 8), one end of each of which is occupied by a bolt 101 which is fixedly mounted in the adjacent inner plate 92 and projects through so as to receive the thumb nut 102. The various thumb nuts are tightened against washers 103. The reader will readily understood by referring to Fig. 8 that the sides of the hopper can be lengthened to the limit of the slots 100. The range of adjustment of the hopper sides will, in practice, be equal to the range of lateral adjustment of the innermost guides 73 and 74.

(4) The stacking elevator stands in position to receive the sticks S and stock L as they are discharged from the spreading table. Fig. 1 gives a good idea as to how this is done. Mention was not made before of the fact that the feeding rolls 46, 47 and 48, 49 were flanged. These rolls are flanged on the sides, and being in longitudinal alinement, serve as guides by which the straight outward feeding or discharging of the sticks is insured. The combined effort of the feeding rolls and the presser roller 50 keeps the discharging pair of sticks and the spread stock carried thereby in a substantially horizontal position until the front ends of the sticks reach and rest upon the supporting plate 104. This plate is shown in Figs. 1 and 2.

The supporting plate 104 operates in a slot 105 in a bumper plate 106 at the left of the stacking elevator. As the sticks S are discharged by the spreading table, and after they rest upon the supporting plate, the ends thereof are intended to strike the bumper plate and thereby even all of the sticks. Fig. 1 shows how all of the sticks are brought into vertical alinement by virtue of the function of the bumper plate. As soon as a discharging pair of sticks reaches the final position in respect to the bumper plates, the supporting plate 104 is withdrawn, causing said stick to rest on the stock underneath throughout the entire length.

An arm 107 carries the supporting plate 104. The attachment of one to the other is effected through a bracket 108 which has a pivotal connection to the arm 107 at 109. This pivot permits the slight relative movement between the plate and arm when the arm is rocked toward the left. The arm 107 is pivotally mounted at 110 to a support 111. The pivotal mounting occurs near the lowermost end of the arm.

Suitable bearings 112 on the support 111 carry a shaft 113 on which an eccentric 114 is mounted. This eccentric rotates continuously and therefore periodically rocks the arm 107 by virtue of operating against that end of the arm which projects below the pivot 110. This periodic rocking in turn periodically withdraws the supporting plate 104 so that successive discharged sticks with their spread stock are laid in place. In practice, the rocking of the arm 107 will be timed with the discharge of the sticks and stock.

A countershaft 115, supported in bearings 116, (Fig. 9) carries sprockets 117 and 118. The former drives a sprocket 119 on the eccentric shaft 113. The latter drives a sprocket 120 on a countershaft 147 situated beneath the elevator shaft 28. The countershaft 147 also carries a sprocket 148 which is driven by a chain 149 from a sprocket 150 on the shaft 7. The lowermost end of the rocking arm 107 is held in engagement with the eccentric 114 by a spring 121 which may be mounted in any suitable manner.

The stacking elevator shaft 28 carries bevel gears 122 and 123 which respectively mesh with pinions 124 and 125 on screw shafts 126 and 127. These shafts respectively have left and right hand screw threads and are made to rotate in opposite directions (see arrows, Fig. 1) by virtue of the particular meshing of the various bevel gears. The lowermost ends of the screw shafts are journalled in step bearings 128 and 129 which also function as supports for the shaft 28, as can plainly be seen in one instance at least in Fig. 9. Each shaft carries a collar 130 (Fig. 1). Each collar includes a rectangular holder 131 which has a set screw 132 by means of which the supporting brackets 133 are held in place. It is upon these brackets that the sticks and the stock to be dried are piled.

A bar 134 supports the upper ends of the screw shafts, bearings 135 being provided to receive the ends of the shafts. Braces 136 illustrate only one conventional method of stabilizing the screw shafts and of keeping the bar 134 straight. Recognizing the need of furnishing a support for the end of the bumper 106 farthest from the screw shaft 126, provision is made of an angle iron 137 (Fig. 2) to which this end of the bumper may be secured. This angle iron is also braced at 138 to withstand the impact of successively discharged sticks. The stack of sticks S and stock L is gradually lowered by the elevator as the height thereof increases. The holding brackets 133 finally reach such a position in relation to the kiln truck 139 as to let the stack rest upon the bolsters 140. These are sufficiently high to permit the release of the stack when the lowermost sticks meet said bolsters. When this condition occurs the operator should shift the drive wheel 25 to the center of the shaft when driving motion of the latter will cease. The transfer truck 141 is then moved to one side on the tracks 142. The truck 139 is carried to such a place where it is intended that the stack shall be wheeled into the kiln. As explained before, shifting of the drive wheel 25 past the center and to the left (Fig. 10) will reverse the stacking elevator so that the holder brackets 133 are again moved toward the top of the screw shafts.

This reversal will have no effect on the feeding table as the drive of the elevator is independent of the drive of the feeding table (Fig. 1). However, the feeding of stock and sticks must stop while the elevator is brought back to the top of the screw shafts. This is done by providing the pulley 13 with a clutch hub 143 (Fig. 2) with which the correspondingly toothed sleeve 144 is adapted to engage when moved by the lever 145. The toothed sleeve moves on a spline 146 on the shaft 7. The pulley 13 is loose on the shaft 7. By clutching or unclutching the pulley 13, the shaft 7 may be made to turn or to stand still.

(5) The operation.

Sticks S are piled in the hopper 86, 82 and 83 lengthwise of the feeding table 1. The stock L is piled in the stock hopper 92, 93 crosswise of the feeding table. This stock may consist of veneer, box shooks, etc. This stock hopper is adjustable to suit the size of material being handled.

To adjust the stock hopper for breadth of stock, the nuts 98 (Fig. 6) are unloosened so that the right bracket 88 can be slid alongside of the guide 71 by which it is supported. The same must be done in respect to the right bracket 89 (Fig. 8) which is carried by the guide 74. Adjustments of the stock hopper for length of material are made by unloosening the thumb screws 102, thereby permitting sliding the outer hopper plates 93 in respect to the inner plates 92.

Adjustments for length of stock also occur in respect to the innermost guides 73 and 74 (Figs. 2 and 8). The reader can readily understand this. Should the length of stock be greater than the hopper is adjusted for in Fig. 8, the various nuts 80 which hold the bolts 77 of the guides 73 and 74 are merely unloosened and these guides slid over toward the right (Fig. 8) on the channel beams 75 and 76. The lugs 69 of the inner chains 66 and 67 feed the stock. The lugs 70 of the outer chains 65 and 68 feed the sticks.

The lugs 70 are located as far apart as the length of the sticks S (Fig. 3). The lugs 69 are located as far apart at least as the breadth of stock which it is desired to feed. In the event of the necessity for the hopper adjustment mentioned above, the stock feeding lugs 69 must also be adjusted for the change in breadth of the stock. This is readily accomplished by changing the chain links (Fig. 12). Practically any width may be provided for by interchanging the links which carry the lugs. The same is true of the lugs 70 which are carried by the stick feed chains.

Now consider the lugs 70 of the chains 65 and 68 to be advancing into engagement with the lowermost one of the pile of sticks S. Fig. 3 shows one of these lugs in such engagement and pushing the lowermost stick toward the stock hopper. The stock hopper guides the sticks for a considerable distance of its movement. The stick slides along the top of the chain guide (71 or 74) and therefore does not come into contact with the chain inside. Only the lug projects through the slot in the top of the guide.

The stock L is supported a sufficient distance above the chain guide by the shelves or brackets 88 and 89 which are the mountings for the sides of the stock hopper. The lowermost piece of stock should be supported above the chain guides a distance at least equal to the thickness of a stick. Otherwise, the end of the stick would abut the lowermost piece of stock and the proper feeding would not result.

As soon as the advancing sticks S project sufficiently under the stock hopper a properly timed pair of stock feeding lugs 39 will be in position to push the lowermost piece of stock from beneath the stock hopper and onto the advancing sticks (Fig. 3). The lowermost piece of stock having been discharged, the pile of stock will fall down upon the bracket shelves and the pair of lugs 69 next following will again push out the lowermost piece. This continues until the entire length of the two sticks in question has been spread with stock on the order suggested in Fig. 1.

It is to be observed that the feeding rollers 47, 49 and 46, 48 are in longitudinal alinement. They have side flanges for the purpose of forming guides for the sticks S when advanced to the front of the feeding table 1. There is a pressure roller 50 which bears down on the stock at a point back of the center of the front shaft 45. This arrangement provides a leverage for keeping the sticks with the carried stock in a substantially horizontal position, at least until the front ends of the sticks reach the supporting plate 104 (Fig. 1). The advance of the sticks continues until the front ends reach the bumper plate 106. The bumper plate functions to even up the front ends of the sticks.

The sticks and stock are piled on the holder brackets 133 of the stacking elevator. The screw shafts 126 and 127 turn in the direction indicated and slowly lower the collars 130 by which these brackets are carried. At the proper time in the operation of the mechanism, the eccentric 114 (Figs. 9 and 11) moves against the lower end of the arm 107, rocking it on the pivot 110 so that the upper end causes the retraction of the supporting plate 104 from beneath the sticks which then rest thereupon. The spring 121 keeps the lower end of the arm 107 against the eccentric and also serves to return the supporting plate 104 into position over the stock now piled on the elevator in readiness to receive the next pair of sticks.

This feeding and stacking operation continues until the elevator is full. At such time the brackets 133 will have lowered sufficiently below the bolsters 140 (Fig. 1) to let the lowermost pair of sticks rest upon said bolsters. The operator should then shift the drive wheel 25 (Figs. 1 and 10) to the center of the shaft 28 so that the rotation thereof ceases. The transfer truck 141 is moved away, the kiln truck 139 is rolled off, an empty kiln truck moved in position and the transfer truck is brought back to its proper place in the stacking elevator, whereupon the drive wheel 25 is moved to the left to the shaft 28 (Fig. 10) and the collars 130 caused to be conveyed toward the top of the stacking elevator in readiness to receive the sticks when the feeding operation starts.

While the construction and arrangement of the improved lumber stacker as herein described and claimed, is that of a generally preferred form, obviously modifications and changes may be made without departing from the spirit of the invention or the scope of the claims.

I claim:

1. A stacker comprising a spreading table, means comprising a hopper adapted to contain sticks, a hopper adapted to contain stock, means for advancing a stick from the stick hopper under the stock hopper, and means causing the stock to be fed along the stick as it advances one piece at a time.

2. A stacker comprising a spreading table, means providing hoppers for holding spacing sticks longitudinally of the table, a hopper disposed transversely of the table for containing stock, means for advancing the nethermost sticks under the stock hopper, and means for displacing the nethermost pieces of stock as the sticks advance, thereby spreading the stock on the sticks in a layer.

3. A stacker comprising a spreading table, means providing hoppers for holding spacing sticks in parallelism longitudinally of the table, a stock hopper disposed transversely of the table and stick hoppers, means having lugs for advancing the nethermost pairs of sticks toward and under the stock hopper, and means having lugs for displacing the nethermost pieces of stock as the sticks advance, thereby spreading the stock over the sticks in a layer.

4. A stacker comprising a spreading table, means providing hoppers for holding spacing sticks in parallelism longitudinally of the table, a stock hopper disposed transversely of the table and stick hoppers, means having lugs for advancing the nethermost pairs of sticks toward and under the stock hopper, means having lugs for displacing the nethermost pieces of stock as the sticks advance, thereby spreading the stock over the sticks in a layer, means for supporting the spacing sticks so that the weight is not imposed upon the advancing means, and means for supporting the stock so that the weight is not imposed upon the displacing means.

5. A stacker comprising a spreading table, means providing hoppers for holding spacing sticks in parallelism longitudinally of the table, means having lugs for advancing the nethermost pair of sticks from beneath the hoppers, means in which said advancing means run and upon which the sticks slide so as not to impose the weight upon the advancing means, a stock hopper disposed transversely of the table and stick hoppers beneath which said sticks are advanced, means for supporting stock in the hopper so as to permit the sticks to pass under, and means for displacing the nethermost pieces of stock in succession as the sticks advance, thereby spreading the stock in layers.

6. A stacker comprising a spreading table, means providing hoppers for holding spacing sticks in parallelism, means carrying lugs for advancing the nethermost sticks from beneath said hoppers, means forming enclosures and guides for said advancing means also supporting the sticks so as to avoid contact with said advancing means, a stock hopper disposed transversely of the sticks, means supporting the stock in spaced relation to said guide means permitting the advance of the sticks beneath the stock, and means for periodically displacing the nethermost pieces of stock as the sticks advance, thereby spreading a layer of stock along the sticks.

7. A stacker comprising a spreading table, means forming hoppers for holding spacing sticks in parallelism, means providing support for said hoppers upon which the sticks rest, means moving in said support having lugs extending through to displace the nethermost sticks, a stock hopper disposed transversely of the sticks, means by which the hopper is supported on said supporting means also furnishing rests for the stock in spaced relation to said supports permitting passage of the sticks when advanced thereunder, means for periodically displacing the nethermost pieces of stock and thereby spreading a layer upon the sticks, and supporting and guide means in which said displacing means run.

8. A stacker comprising a spreading table, means providing hoppers for holding spacing sticks in parallelism, channel guides with slotted tops supported by the table and providing mounts for said hoppers, chains running in said guides and having lugs extending through the slots to engage and advance the nethermost sticks from beneath said hoppers, a stock hopper disposed transversely of the path of the sticks, brackets by which said hopper is mounted on said channel guides, including shelves upon which the stock rests in spaced relation to said guides permitting the sticks to advance under the stock, chains having lugs to successively engage the nethermost pieces of stock and spread the pieces in a layer as the sticks advance, and channel guides in which said chains run having lugs projecting through a slotted top.

9. A stacker comprising a spreading table, means for advancing sticks in parallelism along the table, means for spreading a layer of stock along the sticks as they advance, and means for projecting said sticks with the carried stock beyond the front of the table in a substantially horizontal plane.

10. A stacker comprising a spreading table, means for advancing spacing sticks in parallelism along the table, means for spreading a layer of stock over the sticks as they advance, and means at the front end of the table continuing the advancement of the sticks and carried stock and providing the sole support therefor for the major part of their length while projecting them beyond the front of the table.

11. A stacker comprising a feeding table, means for advancing spacing sticks in parallelism along the table, means for spreading a layer of stock along the sticks as they advance toward the front end, means situated at the front end of the table furnishing the sole support of the sticks and carried stock for the major length thereof as they are projected beyond the front of the table, and means for receiving and supporting the front ends of the sticks as they are discharged from the feeding table.

12. A stacker comprising a feeding table, means for advancing spacing sticks in parallelism along the table, means for spreading a layer of stock along the sticks as they advance toward the front end, means situated at the front end of the table furnishing the sole support of the sticks and carried stock for the major length thereof as they are projected beyond the front of the table, means for receiving and supporting the front ends of the sticks as they are discharged from the feeding table, and an elevator by which said sticks and stock are adapted to be received.

13. A stacker comprising a feeding table, means for advancing spacing sticks in parallelism along the table, means for spreading a layer of stock along the sticks as they advance toward the front end, means situated at the front end of the table furnishing the sole support of the sticks and carried stock for the major length thereof as they are projected beyond the front of the table, means for receiving and supporting the front ends of the sticks as they are discharged from the feeding table, an elevator by which said sticks and stock are adapted to be received, and means for displacing the supporting means so as to permit said sticks and stock to rest upon the elevator.

14. A stacker comprising a spreading table, means for advancing spacing sticks in parallelism along the table, means for spreading a layer of stock along the sticks as they are advanced toward the front of the table, means situated at the front of the table for supporting the sticks and stock as they are projected therefrom, an elevator adapted to receive the sticks and stock, means for receiving and supporting the front ends of the sticks preparatory to depositing them upon the elevator, means against which the ends of the sticks abut to even them, and means for displacing said supporting means.

15. A stacker comprising a spreading table, alined feed rolls for projecting spacing sticks which carry a layer of stock beyond the front end of the table, and a pressure roller bearing on the stock at a point behind the center of the front rolls to support said sticks and stock substantially in the plane of the table during the projection of the major part of the length of said sticks.

16. A stacker comprising a spreading table, pairs of flanged feed rolls in longitudinal alinement adapted to project spacing sticks having a layer of stock spread thereon beyond the front end of the table, and a pressure roller situated between the alined pairs of rolls thereby acting as a lever supporting said sticks and stock substantially in the plane of the table during the major projection period.

17. A stacker comprising a spreading table, pairs of flanged feed rolls in longitudinal alinement adapted to project spacing sticks having a layer of stock spread thereon beyond the front end of the table, a pressure roller situated between the alined pairs of rolls thereby acting as a lever supporting said sticks and stock substantially in the plane of the table during the major projection period, and supporting means for receiving the ends of the sticks when they are about to be discharged from said feeding rolls.

18. A stacker comprising a spreading table, pairs of flanged feed rolls in longitudinal alinement adapted to project spacing sticks having a layer of stock spread thereon beyond the front end of the table, a pressure roller situated between the alined pairs of rolls thereby acting as a lever supporting said sticks and stock substantially in the plane of the table during the major projection period, and supporting means for receiving the ends of the sticks when they are about to be discharged from said feeding rolls.

19. A stacker comprising a spreading table, pairs of flanged feed rolls in longitudinal alinement adapted to project spacing sticks having a layer of stock spread thereon beyond the front end of the table, a pressure roller situated between the alined pairs of rolls thereby acting as a lever supporting said sticks and stock substantially in the plane of the table during the major projection period, supporting means for receiving the ends of the sticks when they are about to be discharged from said feeding rolls, and means adjacent to said supporting means against which the ends of the sticks abut to even them.

20. A stacker comprising a spreading table, longitudinally alined feeding rolls for projecting spacing sticks carrying a layer of stock, flanges on said rolls for guiding the sticks during projection, a pressure roller bearing on the stock at a point behind the front feed rolls thereby exerting a lever action to keep the sticks and stock substantially in the plane of the table during the major period of projection, a stacking elevator having a supporting plate to receive the front ends of the sticks approximately at the time of discharge from the feed rolls, a bumper which the front ends of the sticks are adapted to abut to even the sticks, and means to retract the supporting plate behind the bumper to permit said sticks and stock to rest on the elevator.

21. A stacker having an elevator comprising shoulder brackets, means by which they are supported and moved downward, a spreading table having means for projecting spacing sticks carrying a layer of stock into position above said brackets, means to receive and temporarily support the ends of the sticks opposite the table, means in position to be abutted by said ends to even the sticks, and means for displacing said supporting means to let the sticks rest upon said brackets.

22. A stacker having an elevator comprising shoulder brackets, means by which they are supported and moved downward, a spreading table having means for projecting spacing sticks carrying a layer of stock into position above said brackets, means to receive and temporarily support the ends of the sticks opposite the table, means in position to be abutted by said ends to even the sticks, means for displacing said supporting means to let the sticks rest upon said brackets, and means causing said supporting means to move back into place above the deposited stock in readiness to receive the next sticks.

23. A stacker including an elevator which comprises screw shafts, means for turning the screw shafts, holder brackets adapted to be lowered as the shafts turn, a plate for receiving and supporting the ends of spacing sticks carrying a layer of stock as they are projected across said brackets, a bumper plate abutted by the ends of the sticks to even them, means to retract said plate to deposit the sticks upon said brackets, and means causing the return of the plate to a position above the stock to receive other sticks.

24. A stacker including an elevator comprising screw shafts, means to turn the screw shafts, holder brackets which are lowered as said shafts turn, a plate for receiving and supporting the ends of sticks carrying a layer of stock projected over the brackets, a bumper plate adapted to be abutted by the ends of the sticks to even them, an arm to which the plate is attached, an eccentric adapted to move the arm to retract the plate and deposit the sticks upon the brackets, and a spring in connection with the arm keeping it in contact with the eccentric and causing the return of the supporting plate to a position above the stock when the eccentric moves away.

25. A stacker including an elevator comprising screw shafts having right and left hand threads, means for rotating the shafts in opposite directions, a collar carried by each shaft, a holder bracket carried by each collar, a plate situated above one of the brackets adapted to receive and support the adjacent ends of spacing sticks carrying a layer of stock projected for deposit upon the brackets, a bumper plate which said sticks abut to even the ends, and means to retract the plate to let said ends down upon said bracket as both collars are being lowered.

26. In a stacker, a supporting plate adapted to receive the ends of spacing sticks carrying a layer of stock, a bumper plate adapted to be abutted by the ends of said sticks and having an opening occupied by said supporting plate, a holder bracket situated beneath the supporting plate, and means for retracting said supporting plate in said opening to let said ends down upon the bracket.

27. In a stacker, a holder bracket, a plate above said bracket adapted to receive the ends of sticks having a layer of stock preparatory to deposit upon said bracket, a bumper plate adapted to be abutted by said sticks to even the ends having an opening occupied by the supporting plate, a bracket to which the supporting plate is fastened, an arm by which said bracket is carried, and means for moving the arm to retract the supporting plate in said opening and drop said ends upon said holder brackets.

28. In a stacker, a holder bracket, a supporting plate adapted to receive the ends of sticks preparatory to dropping them into position upon said bracket, a bumper plate adapted to be embedded to even the sticks having a slot in which said supporting plate operates, a bracket by which the supporting plate is held, an arm to which said bracket is attached, means upon which said arm is pivotally mounted, and an eccentric adapted to operate against the arm at one side of the pivot to retract the supporting plate in said slot and release said sticks.

29. In a stacker, a holder bracket, a supporting plate adapted to receive the ends of sticks preparatory to dropping them into position upon said bracket, a bumper plate adapted to be embedded to even the sticks having a slot in which said supporting plate operates, a bracket by which the supporting plate is held, an arm to which said bracket is attached, means upon which said arm is pivotally mounted, an eccentric adapted to operate against the arm at one side of the pivot to retract the supporting plate in said slot and release said sticks, and a spring connected with the arm both holding it in contact with the eccentric and causing the replacement of the supporting plate when the eccentric moves away.

30. A stacker including an elevator having a pair of screw shafts, a collar carried by the screw shafts, a holder bracket carried by the collar, means for depositing spacing sticks carrying layers of stock upon said brackets, means for turning the screw shafts to lower the collar and consequently the stack of sticks and stock, and a kiln truck in position to receive said stack having bolsters below which said holder brackets are adapted to move in order to deposit said stock.

31. A stacker comprising a spreading table, means by which spacing sticks are advanced along the table, means by which stock is spread in a layer along the sticks, means by which the sticks and stock are projected beyond the front of the table, an elevator by which said sticks and stock are adapted to be received, means by which the elevator is gradually lowered as the stack increases, common driving means for all of the foregoing mechanisms, and means for reversing said driving mechanism to again raise the elevator after said stack has been discharged.

32. A stacker comprising a spreading table, means by which spacing sticks are advanced along the table, means by which stock is spread in a layer along the sticks, means by which the sticks and stock are projected beyond the front of the table, an elevator by which said sticks and stock are adapted to be received, means by which the elevator is gradually lowered as the stack increases, common driving means for all of the fore-going mechanisms, means for reversing said driving mechanism to again raise the elevator after said stack has been discharged, and means for unclutching the advancing, spreading and projecting means upon said reversal.

33. A stacker comprising a spreading table, a frame of which the table is a part, an elevator at one end of the table, means on the table for advancing spacing sticks toward the elevator, means for spreading a layer of stock along the sticks as they are advanced, means at the end of the table for projecting said sticks and stock into position above the elevator, means for gradually lowering the elevator as the stack increases, a driving mechanism carried by the frame, means by which the advancing means, spreading means and projecting means are driven by said driving mechanism, and means by which said elevator is operated from said driving mechanism.

34. A stacker comprising a spreading table, a frame of which the table is a part, an elevator at one end of the table, means on the table for advancing spacing sticks toward the elevator, means for spreading a layer of stock along the sticks as they are advanced, means at the end of the table for projecting said sticks and stock into position above the elevator, means for gradually lowering the elevator as the stack increases, a driving mechanism carried by the frame, means by which the advancing means, spreading means and projecting means are driven by said driving mechanism, means by which said elevator is operated from said driving mechanism, and a clutch included in said driving mechanism permitting disconnection of the advancing, spreading and projecting means on the table without stopping the operation of the elevator.

35. A stacker comprising an elevator, a spreading table including a frame of which it is a part, means on the spreading table for arranging stock upon sticks and projecting them into position over the elevator, drive mechanism on the frame by which said means are operated, means by which the elevator is operated from said drive mechanism including a shaft, a disk on an end of the shaft, a drive wheel included in said means having engagement with the face of said disk, and shifting means for moving the drive wheel over the face of the disk at either side of the shaft to vary the speed in either a forward or a reverse direction.

36. A stacker comprising a spreading table, means comprising hoppers to contain spacing sticks, means for advancing single sticks from beneath the stick hoppers, means by which the advancing means are guided and upon which the stick hoppers are mounted, means comprising a stock hopper also mounted upon said guide means beneath which hopper the sticks are advanced, means permitting such adjustment of the guide means and its associated parts as will adapt the stick hoppers to a particular length of stock, and means permitting corresponding expansion of the stock hopper to accommodate such stock.

37. A stacker comprising hoppers to contain spacing sticks, a hopper to contain stock disposed crosswise of the sticks, means to feed the nethermost sticks from the stick hoppers beneath the stock hopper, means for feeding the nethermost stock from the stock hopper along said sticks, means permitting lateral adjustment of the stick hoppers, and all feeding means to accommodate any length of variation in a run of stock, and means permitting a corresponding expansion of the stock hopper to accommodate such lengths of variation in the stock.

38. A stacker having hoppers to contain spacing sticks, a hopper in a transverse position to contain stock, said hopper having manifold sides, means to feed nethermost sticks toward the stock hopper, means to feed nethermost stock along the sticks as they advance, means permitting such adjustment to increase the transverse distance between stick hoppers to accommodate a length of variation in a run of stock thereby to properly place the spacing sticks, and means by which the manifold sides of the stock hopper may be adjusted in respect to each other to expand the stock hopper and accommodate such stock.

39. A stacker comprising a spreading table including transverse supports including beams, hoppers to contain spacing sticks disposed lengthwise of the table, a hopper to contain stock disposed transversely of the table, feed means to advance nethermost sticks beneath the stock hopper, feed means to displace nethermost stock as the sticks advance, guide means for the several feed means, certain guide means providing supports for both stick and stock hoppers, means by which the several guide means are held upon the beams, permitting relative adjustment of the guide means and associated parts to accommodate different sizes of stock, and means to correspondingly expand the stock hopper.

40. A stacker comprising a spreading table, a hopper to hold stock in a position transversely of the table, said hopper having manifold sides, feed means including chains running beneath the stock hopper and having lugs to displace the nethermost stock, guide means in which said chains run, separate brackets extending from the several manifold sides to points of connection with the nearest guide means, said brackets including means upon which the stock rests out of contact with the chains, transverse supporting means including beams upon which the guide means may be relatively adjusted to compensate for any change in length of the stock in the hopper, and means including bolt and slot connections in said manifold sides permitting expansion of the stock hopper to conform.

41. In a stacker including a spreading table, a hopper containing stock disposed crosswise of the table, means passing beneath the hopper to displace the nethermost stock, means in which the displacing means run for guidance, and separate brackets at the ends of the stock hopper attached to the sides thereof and to said guide means for support, the supporting brackets of one side having a slotted continuation permitting lateral adjustments of said sides.

42. A stacker having a hopper to contain stock, the sides of the hopper being composed of inner and outer plates, the corners of the outer plates being cut away at one end of the hopper, means passing beneath the hopper to dislodge nethermost stock, means in which said dislodging means is guided, brackets attached to each one of the plates at opposite ends of the hopper and secured to said guide means, said brackets including outwardly bent portions making room for the passage of nethermost stock, shelves included in the construction of each bracket to support stock, the brackets at one end being secured to the innermost plate at said cut out portions, and means to secure the plates together.

ALPHONSE JOSEPH DE LATEUR.